Aug. 26, 1969 R. J. HANCE 3,463,005
IMMERSION MOLTEN METAL SAMPLER DEVICE
Filed July 12, 1966
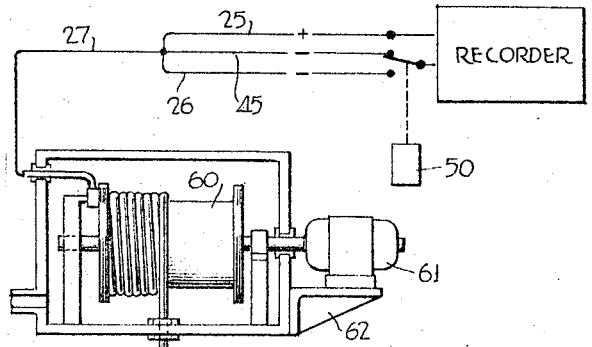
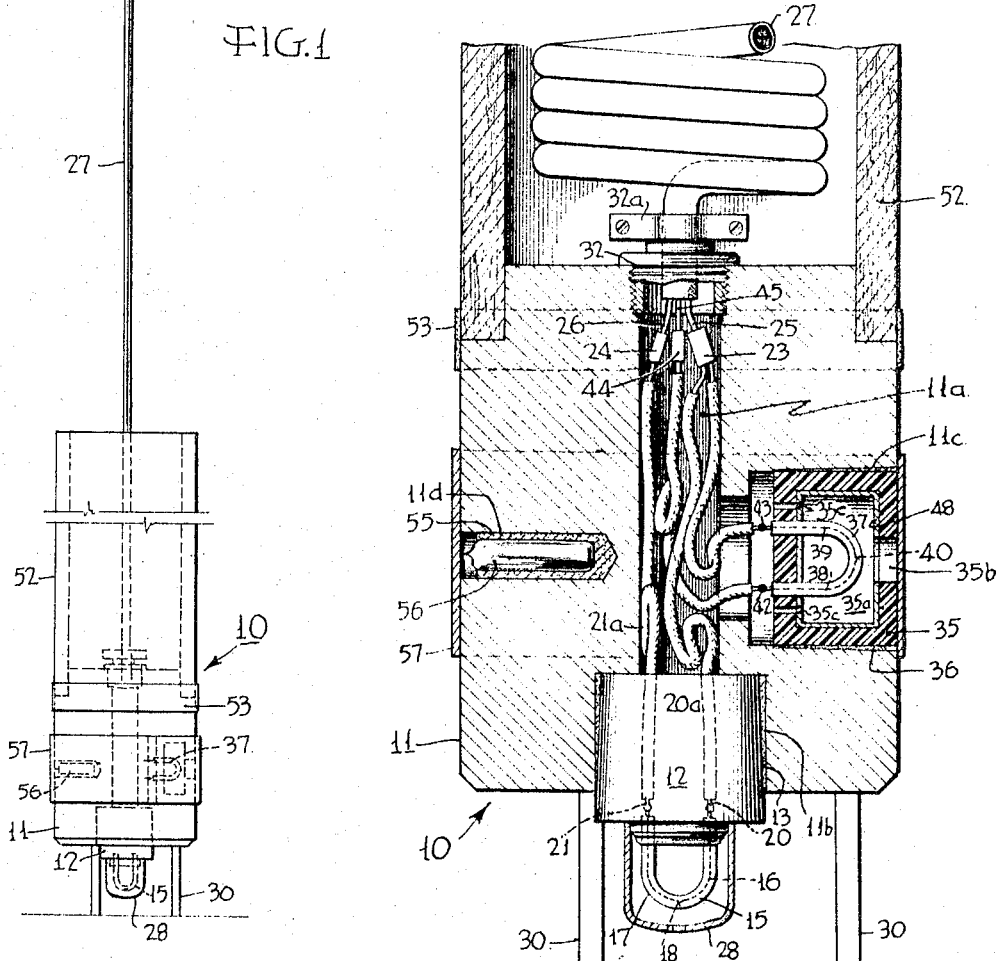

United States Patent Office 3,463,005
Patented Aug. 26, 1969

1

3,463,005
IMMERSION MOLTEN METAL SAMPLER DEVICE
Richard J. Hance, Philadelphia, Pa., assignor to Leeds & Northrup Company, Philadelphia, Pa., a corporation of Pennsylvania
Filed July 12, 1966, Ser. No. 564,568
Int. Cl. G01k 1/00
U.S. Cl. 73—341                                 10 Claims

ABSTRACT OF THE DISCLOSURE

An immersion molten material sampler device for measuring the temperature of molten material at a subsurface level of a molten bath and for measuring the liquidus arrest temperature of a sample of the molten material. A weighted body having a cavity therein receives a sample of the molten material and temperature sensing means disposed in the cavity measures the liquidus arrest temperature of the sample in the cavity. A second temperature sensing means projects from the body and is adapted to measure the temperature of the molten bath. Electrical circuit connections extend from each of the temperature sensing means to a location above the surface of the bath, and means is provided for alternately connecting the circuit connections to a temperature measuring instrument for alternately recording the temperature of the bath and the liquidus arrest temperature of the sample in the cavity.

---

This invention relates to an immersion molten material sampler device and has for an object provision of an immersion device for taking a sample of a molten material at a subsurface level of a bath of molten material while measuring the temperature of the bath.

In the manufacture, for example, of metals, and particularly steel, it is desirable to make various tests of the material of the molten bath before it is poured. Among these tests are included the determination of the temperature of the bath; the determination of the percentage content of carbon, hydrogen, oxygen, nitrogen; and, also, the determination of the presence or concentration of minor constituents in the steel.

A general purpose immersion molten material sample is disclosed in copending application Ser. No. 563,108, filed July 6, 1966, by Gerald P. Boyle, a co-employee of applicant. The present invention relates to an immersion molten material sampler device particularly suited for use in the sampling of molten steel in basic oxygen furnaces and large ladles. Such furnaces, due to their high efficiency, can produce steel at a much faster rate than in furnaces of the open hearth type. For example, the total time for steel production in a basic oxygen furnace runs from 30 to 45 minutes. Apparatus for measuring the bath temperature in a basic oxygen furnace may be of the type disclosed in copending application Ser. No. 446,000, filed Apr. 6, 1965, by Louis R. Jones, Jr., a co-employee of applicant, or of the type disclosed in copending application Ser. No. 514,961, filed Dec. 20, 1965, by Kenneth B. Parker, Jr., who is also a co-employee of applicant.

The present invention is adapted to not only measure the temperature of the bath in a basic oxygen furnace but also concurrently to measure and record the liquidus arrest temperature of a molten metal sample of the bath and, also, to obtain a sample of the molten metal bath which may be used for analysis in a spectrograph or analysis by other techniques.

In accordance with the present invention, there is provided an immersion molten metal sampler device for measuring the temperature of the molten metal at a subsurface level of a molten metal bath. Such device comprises a weighted body having a cavity therein closed at one end and open at the other end to receive a sample of the molten metal at the subsurface level of the bath. The body has the characteristic of permitting the sample to cool below the temperature of the molten bath while the body is immersed in the bath. First temperature sensing means is disposed in the cavity and adapted to measure the liquidus arrest temperature of the sample in the cavity. A second temperature sensing means projects from the body and is adapted to measure the temperature of the molten metal bath. Electrical circuit connections extend from each of the temperature sensing means to a location above the surface of the bath and means is provided for alternatively connecting the circuit connections to a temperature measuring instrument for alternately recording the temperature of the bath and the liquidus arrest temperature of the sample in the cavity.

In accordance with a further aspect of the invention, a cavity for receiving the sample of molten metal is provided with a thin aluminum liner on the inside wall thereof to dioxidize the sample as it enters the cavity.

In accordance with another aspect of the invention, the sampler device is provided with a second cavity with means for obtaining a sample of the bath which will readily freeze and have the required surface smoothness for subsequent use in chemical or spectrographic analysis of the sample. In accordance with this aspect of the invention, there is further provided means for withdrawing the immersion sampler device from the bath.

For further objects and advantages of the invention, reference may be had to the following description taken in conjunction with the accompanying drawings, in which:

FIG. 1 is an elevational view of an immersion sampler device and associated apparatus embodied in the present invention; and FIG. 2 is a vertical sectional view of the immersion sampler device shown in FIG. 1.

Referring to FIG. 1, there is illustrated an immersion molten material sampler device 10 for concurrently obtaining a sample of molten material at a subsurface level of a bath of molten material, concurrently recording the liquidus arrest temperature of a sample of the molten material and measuring the temperature of the molten bath. The device 10 is particularly suited for obtaining such data from a molten steel bath in a basic oxygen furnace.

As may be seen in FIG. 2, the device 10 includes a weighted body 11, preferably made of cast iron or steel so as to have adequate mass for moving the device 10 to a subsurface level of the bath in a basic oxygen furnace. The body 11 is provided with a passage 11a extending axially thereof and counterbored at the lower end to receive the temperature measuring assembly for measuring the temperature of the bath. Such temperature measuring assembly is generally of the type disclosed in the Mead Patents 2,999,121 and 3,038,951; Moore Patent 3,024,295; Parker Patent 3,048,682 and Robertson et al. Patent 3,055,961. The assembly comprises a block 12 of ceramic, hardwood, or other suitable material, which is tapered at its upper end and adapted to be held in the counterbore 11b by cement 13. The block 12, in turn, supports the spaced ends of a U-tube 15, through which extends a pair of dissimilar thermocouple elements 16 and 17 connected together at one of their ends to form a hot or measuring junction 18 for the thermocouple. The tube 15 is a refractory protective tube which may be made of silica, quartz or "Vycor." The thermocouple elements 16 and 17 will normally be made from noble metal materials and, thus, in order to use short lengths of these elements, their ends opposite the hot junction 18 are connected within the block 12 to lengths of lead wire extensions or conductors 20 and 21. The lead wire extensions 20 and 21 preferably are covered with insulating sleeves 20a and 21a to avoid short circuits between the conductors. The opposite ends of the conductors 20 and 21 are respectively connected as by crimp connectors 23 and 24 to conductors 25 and 26 in the multiconductor cable 27.

A fusible cap or closure 28 is adapted to be secured to the block 12 to protect the U-tube 15 as it passes through the slag to the subsurface level of the molten metal bath. The cap 28 rapidly melts in the bath exposing the refractory protected thermocouple to the molten metal as disclosed in the aforesaid patents and applications. The lower end of the weighted body 11 preferably is provided with three equally spaced legs 30 to prevent the device 10 from striking the bottom of the furnace during immersion and also to protect the thermocouple assembly 15–18 and the cap 28 when the device 10 is being stored prior to use.

The upper end of the body 11 is provided with a threaded opening which is adapted to receive a threaded connector 32 which includes a clamp 32a for attachment to the cable 27. A device generally of this type, as thus far described, is disclosed in the aforesaid copending applications Ser. No. 446,000, of Louis R. Jones, Jr. and Ser. No. 514,961, of Kenneth B. Parker.

The body 11 is also provided with a transverse opening or counterbore 11c which is adapted to receive therein a refractory member 35 having a cavity 35a therein which is closed at the rear end and is provided with a small diameter opening or passage 35b at the outer end. The member 35 is adapted to be retained in the opening 11c as by suitable cement 36. A U-tube 37 is supported at the rear of the cavity 35a. Thermocouple elements 38 and 39 serially extend through the refractory protective tube 37 and are joined at 40 to provide a hot or measuring junction for the thermocouple. The U-tube 37 is similar to the U-tube 15, previously described, and the thermocouple element 38 is of the same material as thermocouple element 16. Likewise, thermocouple element 39 is of the same material as thermocouple element 17. The free ends of the thermocouple elements 38 and 39 are respectively connected to insulated lead wire extensions 42 and 43 which, in turn, are respectively connected to crimp connectors 44 and 23 which, in turn, are connected to the conductors 45 and 25 in the multiconductor cable 27.

From the foregoing, it will be seen that the thermocouple elements 16 and 39 are both connected to the same conductor 25 of the cable 27. As illustrated in FIG. 1, it will be assumed that the conductor 25 is of positive polarity corresponding to the two thermocouple elements 16 and 39. The negative polarity thermocouple elements 17 and 38 are respectively connected to the conductors 26 and 45 of the cable 27.

As may be seen in FIG. 2, the cavity 35a is adapted to receive a sample of the molten metal at the subsurface level of the bath. The sample enters the reduced diameter passage 35b. The rear of the cavity 35a is provided with venting means 35c for permitting the escape of entrapped air from the cavity 35a upon entry of the sample. The material of the member 35 also has the characteristic of causing the sample to cool at a controlled rate below the temperature of the molten bath while the body 11 is immersed in the bath and causing the portion in the passage 35b and that next to the walls of the cavity 35a to freeze, thereby preventing loss of the sample from the cavity 35a. The member 35 may be made of ceramic, as illustrated. The cavity 35a is provided with deoxidizing means in the form of an aluminum liner 48. When the steel sample enters the cavity 35a, it causes the aluminum liner 48 to mix with it, thereby deoxidizing it. The air in the cavity 35a is forced out through the venting openings 35c at the rear of the cavity as the cavity 35a is filled with deoxidized molten steel.

When the device 10 is immersed in the molten metal bath, the thermocouple including the hot junction 18 will measure the temperature of the bath, and the thermocouple including the hot junction 40 will respond to the temperature of the steel sample within the cavity 35a. As shown in FIG. 1, these two thermocouples have a common conductor 25 and, thus, by providing a vibrator 50 for alternately connecting the conductors 26 and 45 to a recorder, chart records may be obtained of the temperatures sensed by each of the thermocouple units. The hot junction 40 of the thermocouple including the thermocouple elements 38 and 39, responds to the temperature of the steel sample within the cavity 35a and, by reason of the heat sink, provided by the walls of the member 35 and the body 11, the sample cools with the thermocouple recording the changing temperature of the cooling steel sample. After the steel sample cools for a few seconds, the temperature drops approximately 75 to 100° F. where it remains constant for about ten seconds, after which the recorded temperature decreases abruptly. The liquidus arrest temperature thus obtained can be correlated to the carbon composition of the steel in a manner well known in the art. Such correlation is similar to the correlation of the liquidus temperatures obtained from cooling curves of gray iron in the determination of carbon equivalent of various iron samples such as disclosed in my copending application Ser. No. 286,312, filed June 7, 1963, now U.S. Patent 3,267,732, issued Aug. 23, 1966. For example, a series of steels are produced having various carbon compositions and their liquidus temperatures measured. From this data, it is only necessary to determine the liquidus temperature of a new batch of steel and such temperature can be accurately correlated from the previous data to the carbon composition of the new batch of steel. This correlation is known to be true as long as the effects of other alloys are taken into account.

In a preferred form of the invention, the upper end of the weighted body 11 is provided with a cardboard tube 52 within which the cable 27 is coiled, as shown in FIG. 2. The cardboard tube 52 protects the lower end of the cable during immersion into the bath. The lower end of the cardboard tube preferably is temporarily held in position on the upper end of the weighted body 11 by means of a plastic tape 53. An arrangement of this type is disclosed in the aforesaid copending application Ser. No. 514,961 of Kenneth B. Parker, Jr.

The conductors 25, 26 and 45 of the multiconductor cable 27 preferably are of relatively heavy gauge so as to provide strength to the cable. The cable preferably is provided with heat protection, such as rubber, paper or equivalent protecting material, to protect the cable from the heat of the molten bath and within the furnace chamber.

Since it is also desirable to obtain a "pin sample" of the molten bath, the device 10 preferably is provided with a second longitudinal opening or counterbore 11d which is opposite the opening 11c as shown in FIG. 2. The opening 11d is adapted to receive a suitable packing material, such as asbestos 55, into which may be placed an evacuated capsule 56 of glass, quartz or other suitable material, or a tubular element of resin coated sand as described in the aforementioned Boyle application Ser. No. 563,108. If the latter is used provisions for venting should be provided such as by connecting cavity 11d to passage 11a. A metal band 57 extends around the circumference of the body 11 and covers the opening 11d which houses the capsule 56 and also covers the opening 35b which leads to the cavity 35a. The metal band 57 may be of a deoxidizing material such, for example, as aluminum and, thus it will deoxidize the samples of molten metal as they enter the cavity 35a and the evacuated capsule 56, the latter having its outer end broken when engaged by the molten metal sample. If such band of deoxidizing material is employed no deoxidizing material need be supplied in the cavities. Alternatively, the band 57 may be of a thin gage steel such as that employed in the cap 28.

After the desired temperature measurement have been obtained and the sample has entered the capsule 56 the device 10 is adapted to be withdrawn from the bath. Inserture sensing means disposed within the cavity and a pair of conductors of said cable, electrical connections between said second temperature sensing means and one of said pair of conductors and the third conductor of said cable, and said device includes a second cavity for obtaining a pin sample, a fusible closure for said second cavity and said second cavity being adapted for quickly freezing the sample received in said second cavity.

8. An immersion molten material sampler device according to claim 7 wherein said device includes weight structure causing said device to sink to a subsurface level of a molten bath.

9. An immersion molten material sampler device according to claim 7 including means including said cable for withdrawing said device from the molten bath for recovery of a sample after solidification thereof.

10. An immersion molten material sampler device according to claim 7 wherein said cavity includes a lining of a material which will deoxidize the sample entering said cavity.

References Cited

UNITED STATES PATENTS

| | | | |
|---|---|---|---|
| 3,267,732 | 8/1966 | Hance | 73—359 |
| 3,298,069 | 1/1967 | Acre | 73—425.4 |
| 3,321,973 | 5/1967 | Anderson | 73—359 |
| 3,357,250 | 12/1967 | Lowdermilk | 73—354 |

FOREIGN PATENTS 553,395  1956  Belgium.

LOUIS R. PRINCE, Primary Examiner

DENIS E. CORR, Assistant Examiner

U.S. Cl. X.R.

73—354, 425.4 tion and withdrawal may be facilitated by the use of a hoist including a drum 60, FIG. 1, around which the cable 27 is wrapped, the drum 60 being adapted to be released for dropping the device 10 into the bath and rotated by means of a motor 61 which is mounted on a bracket 62 supported at a location and above the exterior to the furnace to withdraw the device from the bath. The cable 27 has sufficient strength to withdraw the device 10 so that the solidified sample may be extracted from the cavity 11d in the body 11 for analysis purposes. An example of a suitable hoist is disclosed in France U.S. Patent No. 2,971,041.

From the foregoing description it will be seen that the present invention enables the temperature of the bath to be obained concurrently with the recording of the liquidus arrest temperature of a sample of the molten bath as well as obtain a solidified sample of the bath for subsequent chemical or spectrographic analysis. By permitting all of these measurements and samples to be obtained at one time this minimizes the time required for such operations in a basic oxygen furnace and also enables such operations to be performed without the necessity of withdrawing the oxygen lance and tilting or repositioning the furnace.

While the cable 27 has been illustrated as of the single use or expendable type, it is to be understood that it may be of a more permanent type or it may be protected for multiple usage such, for example, as in the manner illustrated in the aforesaid Patent 2,971,041. Additionally, it may be desirable to make the connections between the cable and the thermocouple units of the plug-in type. Examples of such connections are disclosed in the aforesaid Patents 3,024,295, 3,048,682 and 3,055,961.

It is to be understood that the present invention is not limited to the specific arrangements described and illustrated herein.

What is claimed is:

1. An immersion molten material sampler device for measuring the temperature of molten material at a subsurface level of a molten bath comprising a weighted body having a lined cavity therein closed at one end and open at the other end to receive a sample of the molten material at a subsurface level of the bath, the lining for said cavity having the characteristics of permitting the sample to cool at a controlled rate below the temperature of the molten bath while said body is immersed in the bath, first temperature sensing means disposed within said cavity and adapted to measure the liquidus arrest temperature of the sample in said cavity, a second temperature sensing means projecting from said body and adapted to measure the temperature of the molten bath, electrical circuit connections extending from each of said temperature sensing means for connection to a temperature measuring circuit, said electrical circuit connections being adapted to extend to a location above the surface of the bath, and means for alternately connecting said electrical circuit connections to a single recorder for alternately recording the temperature of the bath and the liquidus arrest temperature of the sample in said lined cavity by the recorder.

2. An immersion molten material sampler device for measuring the temperature of molten material at a subsurface level of a molten bath comprising a weighted body having a lined cavity therein closed at one end and open at the other end to receive a sample of the molten material at a subsurface level of the bath, the lining of said cavity having the characteristics of permitting the sample to cool at a controlled rate below the temperature of the molten bath while said body is immersed in the bath, first temperature sensing means disposed within said cavity and adapted to measure the liquidus arrest temperature of the sample in said cavity, a second temperature sensing means projecting from said body and adapted to measure the temperature of the molten bath, electrical circuit connections extending from each of said temperature sensing means for connection to a temperature measuring circuit, and a second cavity in said body including means for obtaining a pin sample of the bath which will readily freeze.

3. An immersion molten material sampler device for taking a sample of molten material at a subsurface level of a molten bath, said device comprising, a dense metal body of substantial weight to produce immersion of said sampler device below the surface of a molten bath, a counterbore in said dense metal body, a phase change detector device supported in said counterbore, said detector device having wall structure of refractory material forming a cavity thermally insulated from said dense metal body and providing a heat sink to cool a sample admitted to said cavity at a controlled rate below the temperature of the molten bath while said metal body is immersed in the bath, temperature sensing means disposed within said cavity and adapted to respond to the temperature of the sample in said cavity in a manner permitting recording of the changing temperature of the cooling sample to produce a curve showing a phase change temperature, said phase change detector being constructed and arranged and mounted in a manner to prevent loss of molten sample from said cavity, a fusible closure for said cavity, a heat insulated cable including electrical conductors, a wiring passage in said dense metal body for connecting said temperature sensing means to said cable to provide for the conduction of an electrical signal from said phase change detector device to recording means, and means to secure an end of said cable to said dense metal body.

4. An immersion molten material sampler device according to claim 3 wherein said dense metal body has a second counterbore connecting with said wiring passage, a second temperature sensing means mounted in said second counterbore and projecting outwardly for response to the temperature of a molten bath surrounding said sampler device, and an electrical connection between said second temperature sensing means and said cable by way of said wiring passage.

5. An immersion molten material sampler device according to claim 3 wherein said dense metal body has a second counterbore, means defining an elongated cavity of small cross-section supported in said second counterbore in a manner to effect rapid cooling to solidification of sample entering said elongated cavity thereby to form a pin sample, and a fusible closure for said elongated cavity.

6. An immersion molten material sampler device according to claim 3 wherein said dense metal body has two additional counterbores, one supporting a second temperature sensing means projecting outwardly for response to temperature of the molten bath and one for supporting means to obtain a quickly solidified pin sample.

7. An immersion molten material sampler device for taking a sample of molten material at a subsurface level of a molten bath, said device being of the type including an immersible body having walls defining a cavity to receive a molten sample of material when immersed in a molten bath, the walls providing a heat sink to cool said sample at a rate permitting recording of the changing temperature of the cooling sample to produce a curve showing a phase change temperature, a passage through one of the walls for entry of molten sample into the cavity, the passage being constructed and arranged to prevent loss of molten sample from the cavity, a fusible closure for the passage, temperature sensing means disposed within the cavity to sense the temperature of the sample cooling therein, said device also including a second temperature sensing means directly responsive to the temperature of the molten bath outside said sampler device for measuring the temperature of the molten bath into which said device is immersed, and means to connect both of said sensing means to recording means characterized by a cable having three electrically insulated conductors, electrical connections between said tempera-